(12) United States Patent
Iwahori et al.

(10) Patent No.: US 12,626,544 B2
(45) Date of Patent: May 12, 2026

(54) CONTROLLER AND CONTROL METHOD

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 117 days.

(21) Appl. No.: 18/588,798

(22) Filed: Feb. 27, 2024

(65) Prior Publication Data

US 2024/0346861 A1 Oct. 17, 2024

(30) Foreign Application Priority Data

Apr. 17, 2023 (JP) ................................. 2023-067144
Dec. 28, 2023 (JP) ................................. 2023-222219

(51) Int. Cl.
*G07C 5/02* (2006.01)
*B62D 65/00* (2006.01)
*B60R 1/074* (2006.01)

(52) U.S. Cl.
CPC ............. *G07C 5/02* (2013.01); *B62D 65/005* (2013.01); *B60R 1/074* (2013.01)

(58) Field of Classification Search
CPC ........ G07C 5/02; B62D 65/005; B60R 1/074; E02F 9/205; B60Q 3/80; B60Q 1/50; G06V 20/56; G06V 20/58; G08G 1/166
See application file for complete search history.

(56) References Cited

U.S. PATENT DOCUMENTS

| | | | |
|---|---|---|---|
| 2018/0074499 A1* | 3/2018 | Cantrell | B64C 39/024 |
| 2019/0308636 A1 | 10/2019 | Hase et al. | |
| 2020/0209894 A1* | 7/2020 | Torii | G05D 1/1064 |
| 2020/0302708 A1* | 9/2020 | Thompson | G07C 5/0825 |
| 2020/0401153 A1* | 12/2020 | Sui | G05D 1/0223 |
| 2021/0101520 A1* | 4/2021 | Schellinger | F21K 9/00 |
| 2022/0101658 A1 | 3/2022 | Wu et al. | |
| 2022/0269282 A1 | 8/2022 | Ascherl et al. | |
| 2023/0128034 A1* | 4/2023 | Keshipeddy | G01S 13/931 342/70 |
| 2023/0161304 A1* | 5/2023 | Lu | G07C 5/008 700/275 |
| 2024/0062656 A1* | 2/2024 | Forscher | G08G 1/163 |

FOREIGN PATENT DOCUMENTS

| | | |
|---|---|---|
| CA | 03197300 A1 | 4/2022 |
| JP | 05-247745 A | 9/1993 |
| JP | 2017-538619 A | 12/2017 |

* cited by examiner

*Primary Examiner* — Behrang Badii
(74) *Attorney, Agent, or Firm* — Sughrue Mion, PLLC

(57) ABSTRACT

A controller includes a determining unit configured to determine a work assistance operation to be performed by a target moving object, the work assistance operation being an operation to assist work on a moving object, the target moving object including at least one of the moving object and another moving object being located around the moving object, the moving object configured to be operable by unmanned driving, the another moving object configured to be operable by unmanned driving and an instructing unit configured to instruct the target moving object to perform the work assistance operation determined by the determining unit.

12 Claims, 16 Drawing Sheets

CONTROLLER AND CONTROL METHOD

CROSS REFERENCE TO RELATED APPLICATIONS

The patent application claims the priority based on Japanese Patent Applications No. 2023-067144 filed on Apr. 17, 2023, and No. 2023-222219 filed on Dec. 28, 2023, the disclosure of which are hereby incorporated by reference in their entireties.

BACKGROUND

Field

The present disclosure relates to a controller and a control method.

There is a known technique that causes a vehicle to run by unmanned driving in a step of manufacturing the vehicle (for example, Japanese Patent Application Publication (Translation of PCT Application) No. 2017-538619).

In moving a moving object such as a vehicle by unmanned driving instead of conveying the moving object by a conveyor or the like, sufficient consideration has not been given to improving workability of work on the moving object.

SUMMARY

The present disclosure is feasible in the following aspects.

(1) According to a first aspect of the present disclosure, a controller is provided. The controller comprises: a determining unit configured to determine a work assistance operation to be performed by a target moving object, the work assistance operation being an operation to assist work on a moving object, the target moving object including at least one of the moving object and another moving object being located around the moving object, the moving object configured to be operable by unmanned driving, the another moving object configured to be operable by unmanned driving; and an instructing unit configured to instruct the target moving object to perform the work assistance operation determined by the determining unit.

The controller of this aspect allows the work assistance operation to be performed by the target moving object, making it possible to improve performance of the work on the moving object.

(2) In the controller of the above-described aspect, the work assistance operation may include an operation of changing the orientation of at least a part of the moving object.

According to the controller of this aspect, by changing the operation of at least a part of the moving object to be subjected to the work, it becomes possible to improve performance of the work on the moving object.

(3) In the controller of the above-described aspect, the work may be to inspect an appearance of the moving object, the moving object may include a power-folding mirror, and the work assistance operation may include an operation of changing the orientation of the power-folding mirror.

According to the controller of this aspect, by changing the operation of the power-folding mirror, it becomes possible to facilitate inspection on an appearance of the power-folding mirror.

(4) In the controller of the above-described aspect, the work may be to inspect an appearance of the moving object, and the work assistance operation may include an operation of causing the moving object to run in a serpentine manner.

According to the controller of this aspect, by changing the position of the moving object, it becomes possible to facilitate inspection on the appearance of the moving object.

(5) In the controller of the above-described aspect, the target moving object may be the another moving object, the another moving object may include an illumination device configured to emit light, and the work assistance operation may include an operation of emitting light to the moving object from the illumination device of the another moving object.

According to the controller of this aspect, it is possible to improve visibility around a rear part of the moving object.

(6) In the controller of the above-described aspect, the target moving object may include at least one device of a sound device configured to output sound and an illumination device configured to emit light, and the work assistance operation may include an operation of providing information to a worker who performs the work using the at least one device.

According to the controller of this aspect, by providing the information to the worker, it becomes possible to improve performance of the work by the worker.

(7) In the controller of the above-described aspect, the target moving object may include an illumination device configured to emit light changeable in color, and the work assistance operation may include an operation of changing the color of light emitted from the illumination device in response to a progress in the work.

The controller of this aspect allows the worker to recognize a progress in the work.

(8) In the controller of the above-described aspect, the target moving object may include an abnormality information acquiring unit configured to acquire abnormality information as information indicating abnormality at another moving object having been finished the work, and the work assistance operation may include an operation of notifying the occurrence of the abnormality from the target moving object to a worker who performs the work.

According to the controller of this aspect, it is possible to notify the occurrence of the abnormality to the worker without using an item carried by the worker.

(9) In the controller of the above-described aspect, the target moving object may be a vehicle and includes a sound device arranged inside the vehicle, and the work assistance operation may include an operation of notifying the occurrence of the abnormality to the worker using the sound device.

According to the controller of this aspect, it is possible to notify the occurrence of the abnormality to the worker using the sound device provided at the vehicle.

(10) In the controller of the above-described aspect, the target moving object may further include a power window, and the work assistance operation may include an operation of notifying the occurrence of the abnormality to the worker using the sound device after the power window is opened.

According to the controller of this aspect, the notification made using the sound device is recognized easily by the worker.

(11) In the controller of the above-described aspect, the work assistance operation may include an operation of notifying the occurrence of the abnormality and a measure to prevent the recurrence of the abnormality to the worker.

The controller of this aspect allows the worker to be notified of the measure to prevent the recurrence of the abnormality in addition to the occurrence of the abnormality, making it possible to reduce a likelihood that the abnormality will occur repeatedly.

(12) According to a second aspect of the present disclosure, a control method is provided. The control method comprises: determining a work assistance operation to be performed by a target moving object, the work assistance operation being an operation to assist work on a moving object, the target moving object including at least one of the moving object and another moving object being located around the moving object, the moving object configured to be operable by unmanned driving, the another moving object configured to be operable by unmanned driving; and instructing the target moving object to perform the work assistance operation determined in the determining.

The control method of this aspect allows the work assistance operation to be performed by the target moving object, making it possible to improve performance of the work on the moving object.

The present disclosure is feasible in various aspects other than the controller and the control method. For example, the present disclosure is feasible in aspects including a system, a vehicle, a computer program, and a recording medium storing the computer program.

BRIEF DESCRIPTION OF THE DRAWINGS

FIG. 7 is a first explanatory view showing a situation where the vehicle performs a work assistance operation;

FIG. 8 is a second explanatory view showing a situation where the vehicle performs the work assistance operation;

FIG. 9 is a third explanatory view showing a situation where the vehicle performs the work assistance operation;

DETAILED DESCRIPTION

A. First Embodiment

Figure 1:
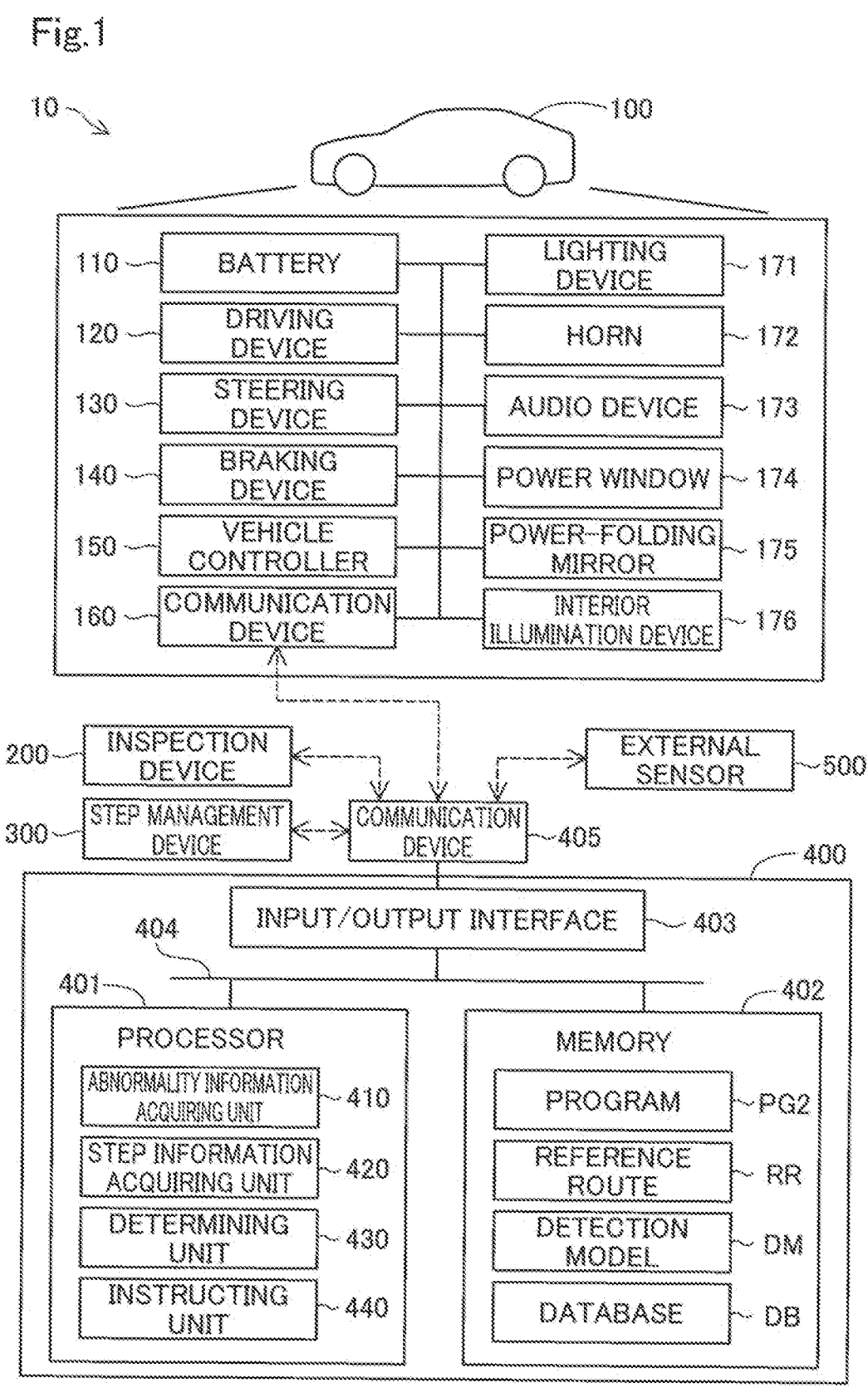
FIG. 1 is an explanatory view showing the configuration of a system according to a first embodiment.

FIG. 1 is an explanatory view showing the configuration of a system 10 according to a first embodiment. In a factory for manufacture of a moving object, the system 10 is used for moving the moving object as a product and for assisting in work on the moving object. The system 10 may be used in a factory for repair of the moving object, not in the factory for manufacture of the moving object.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The system 10 includes at least one vehicle 100, an inspection device 200, a step management device 300, a server device 400, and at least one external sensor 500. In the present embodiment, the server device 400 corresponds to a "controller" of the present disclosure. The server device 400 may be called a remote controller.

In the present embodiment, the vehicle 100 is an electric vehicle configured to become operable by remote control. The vehicle 100 includes: a battery 110 as a power source of the vehicle 100; a driving device 120 for accelerating the vehicle 100; a steering device 130 for changing a traveling direction of the vehicle 100; a braking device 140 for decelerating the vehicle 100; a vehicle controller 150 for controlling each unit of the vehicle 100; and a communication device 160 for communicating with the server device 400 via radio communication. The driving device 120 includes a motor for running, and a drive wheel to be rotated by the motor for running In the present embodiment, the vehicle 100 further includes a lighting device 171, a horn 172, an audio device 173, a power window 174, a power-folding mirror 175, and an interior illumination device 176. The lighting device 171 includes at least one of a headlight, a direction indicator, a taillight, and a fog light. The horn 172 generates warning sound. The audio device 173 is arranged inside the vehicle 100 and is capable of outputting a voice message. The power window 174 is a window capable of being driven to be opened and closed by a motor. The power-folding mirror 175 is a mirror capable of being driven to be opened and closed by a motor and is arranged on a side part of the vehicle 100. The interior illumination device 176 is arranged inside the vehicle 100 or at an opening part of a door, for example. In the present embodiment, the interior illumination device 176 is configured to emit light changeable in color. At least one of the lighting device 171, the horn 172, the audio device 173, the power window 174, the power-folding mirror 175, and the interior illumination device 176 is omissible from the vehicle 100. In the present disclosure, a device to emit light such as the lighting device 171 or the interior illumination device 176 may be called an "illumination device," and a device to output sound such as the horn 172 or the audio device 173 may be called a "sound device."

Figure 2:
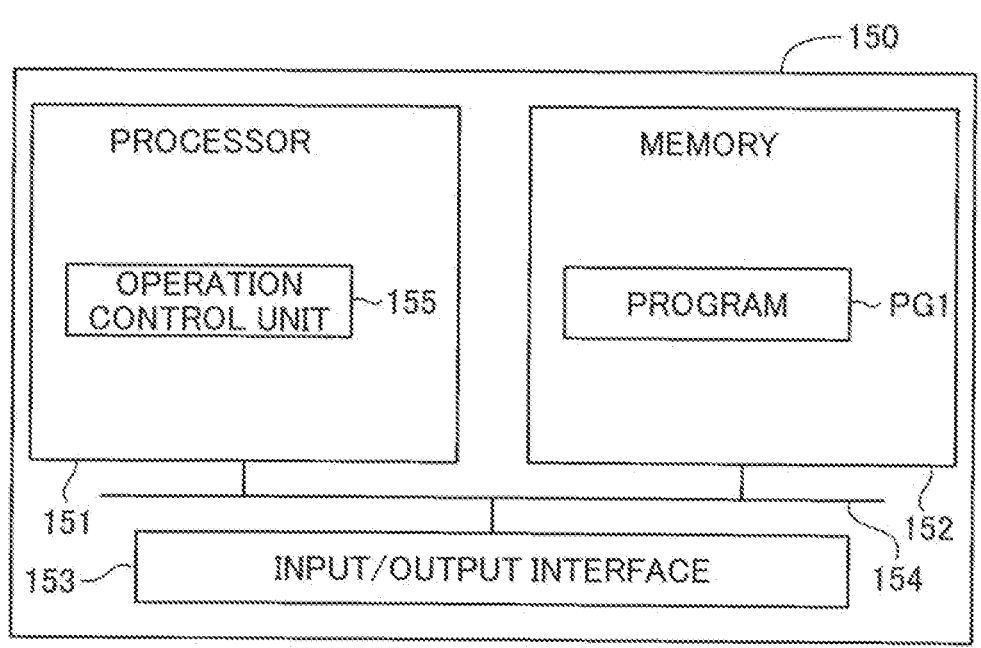
FIG. 2 is an explanatory view showing the configuration of a vehicle controller according to the first embodiment.

FIG. 2 is an explanatory view showing the configuration of the vehicle controller 150. The vehicle controller 150 is configured using a computer including a processor 151, a memory 152, an input/output interface 153, and an internal bus 154. The processor 151, the memory 152, and the input/output interface 163 are connected to each other via the internal bus 154 in a manner allowing bidirectional communication therebetween. The driving device 120, the steering device 130, the braking device 140, the communication device 160, the lighting device 171, the horn 172, the audio device 173, the power window 174, the power-folding mirror 175, and the interior illumination device 176 are connected to the input/output interface 153.

The processor 151 executes a computer program PG1 stored in advance in the memory 152 to function as an operation control unit 155. With a passenger on board the vehicle 100, the operation control unit 155 is capable of causing the vehicle 100 to operate by controlling each unit of the vehicle 100 in response to an action by the passenger. The operation control unit 155 is capable of causing the vehicle 100 to operate by controlling each unit of the vehicle 100 in response to a control signal received from the server device 400 independently of whether the passenger is on board the vehicle 100.

As shown in FIG. 1, the inspection device 200 is a device for conducting inspection on the vehicle 100. The inspection device 200 includes various types of units for the inspection, and a computer that controls these units. The inspection device 200 generates information about abnormality at the vehicle 100 as a product. In the following description, the information about the abnormality at the product will be called abnormality information. In the present embodiment, the abnormality information includes information indicating an identification number of the product where the abnormality has been detected and a type of the abnormality at the product. The inspection device 200 includes a communication device not shown in the drawings, and communicates with the step management device 300 and the server device 400 via wire communication or radio communication.

The step management device 300 is a device for managing a step of manufacturing the vehicle 100. The step management device 300 is configured using a computer. The step management device 300 acquires information from various types of facilities in a factory and generates information about a step of manufacturing the vehicle 100 as a product. These facilities in the factory include the inspection device 200. In the following description, the information about a step of manufacturing a product will be called step information. In the present embodiment, the step information includes information indicating work to be conducted, when and where the work is to be conducted, a worker to conduct the work, and a product to be subjected to the work, information indicating work having been conducted, when and where the work was conducted, a worker having conducted the work, and a product having been subjected to the work, and information indicating a progress in work. The step management device 300 includes a communication device not shown in the drawings, and communicates with the inspection device 200 and the server device 400 via wire communication or radio communication.

The server device 400 is configured using a computer including a processor 401, a memory 402, an input/output interface 403, and an internal bus 404. The processor 401, the memory 402, and the input/output interface 403 are connected to each other via the internal bus 404 in a manner allowing bidirectional communication therebetween. A communication device 405 is connected to the input/output interface 403. The communication device 405 is used for communicating with the vehicle 100 via radio communication and communicating with the inspection device 200 and the step management device 300 via wire communication or radio communication. The memory 402 stores a computer program PG2. The processor 401 executes the computer program PG2 to function as an abnormality information acquiring unit 410, a step information acquiring unit 420, a determining unit 430, and an instructing unit 440.

The abnormality information acquiring unit 410 acquires abnormality information from the inspection device 200. The step information acquiring unit 420 acquires step information from the step management device 300. The determining unit 430 determines an operation to be performed by a target vehicle including at least one of the vehicle 100 and a different vehicle 100 existing around the former vehicle 100 in order to assist in work on the vehicle 100. The instructing unit 440 instructs the vehicle 100 to perform the operation. The operation by the vehicle 100 includes a running operation and a work assistance operation. The running operation is an operation relating to running of the vehicle 100, in other words, an operation relating to "run," "turn," and "stop" of the vehicle 100. The work assistance operation is an operation to be performed by the vehicle 100 for assisting in work on the own vehicle or work on a different vehicle. The work assistance operation includes an operation of notifying a worker that abnormality has occurred as a result of work conducted by the worker. For example, the work assistance operation includes an operation of changing the orientation of at least a part of the vehicle 100, an operation of outputting sound from a device mounted on the vehicle 100, and an operation of emitting light from a device mounting on the vehicle 100. More specifically, the work assistance operation includes running of the vehicle 100, emission of light by the lighting device 171, sounding of the horn 172, output of a voice message from the audio device 173, opening and closing of the power window 174, opening and closing of the power-folding mirror 175, emission of light by the interior illumination device 176, and others. The target vehicle 100 may be called a target moving object.

The external sensor 500 is a sensor arranged outside the vehicle 100. The external sensor 500 is used for detecting the location and position of the vehicle 100. In the present embodiment, the external sensor 500 is a camera installed in a factory KJ. The external sensor 500 includes a communication device not shown in the drawings, and communicates with the server device 400 via wire communication or radio communication.

Figure 3:
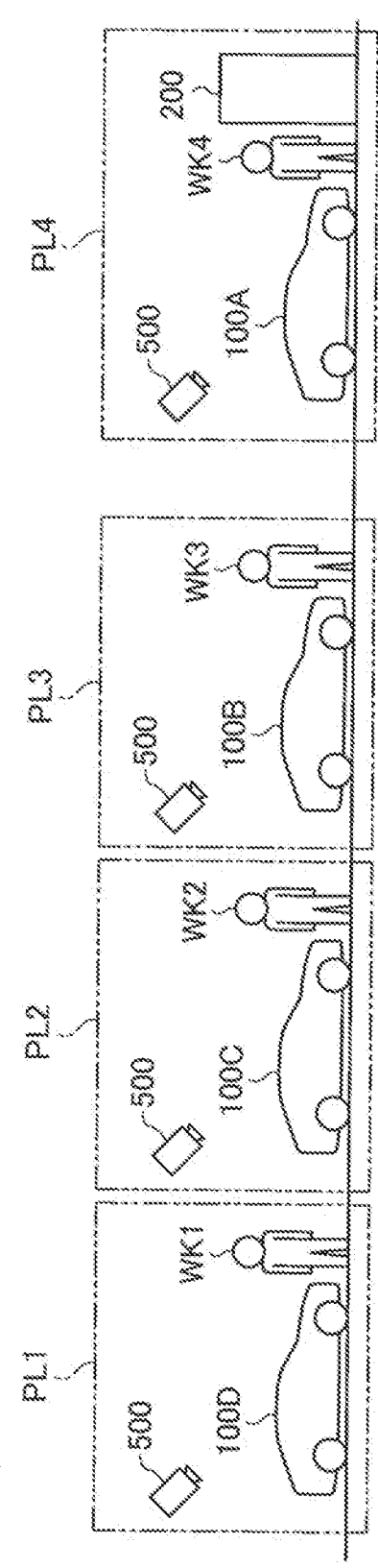
FIG. 3 is an explanatory view showing a step of manufacturing a vehicle.

FIG. 3 is an explanatory view showing a step of manufacturing the vehicle 100. FIG. 3 shows four vehicles 100A to 100D being manufactured in the factory KJ. In the following, when the vehicles 100A to 100D will be described without being distinguished from each other particularly, the vehicles 100A to 100D will be called a vehicle 100 simply. The factory KJ has a first place PL1, a second place PL2, a third place PL3, and a fourth place PL4. The first place PL1, the second place PL2, and the third place PL3 are places for implementation of work of mounting components on the vehicle 100, for example. The first place PL1, the second place PL2, and the third place PL3 may be places for implementation of work of adjusting an optical axis of a headlight or adjusting wheel alignment of the vehicle 100 instead of the work of mounting components on the vehicle 100, for example. The fourth place PL4 is a place for implementation of work of inspecting the vehicle 100. The vehicle 100 moves in the factory KJ through the first place PL1, the second place PL2, the third place PL3, and the fourth place PL4 in this order. A first worker WK1 is assigned at the first place PL1. A second worker WK2 is assigned at the second place PL2. A third worker WK3 is assigned at the third place PL3. A fourth worker WK4 is assigned at the fourth place PL4. Each of the workers WK1 to WK4 conducts work assigned to the worker himself or herself on the vehicle 100A, the vehicle 100B, the vehicle 100C, and the vehicle 100D in this order at the own place of assignment. After the vehicle 100 passes inspection at the fourth place PL4, the vehicle 100 is shipped from the factory KJ.

Figure 4:
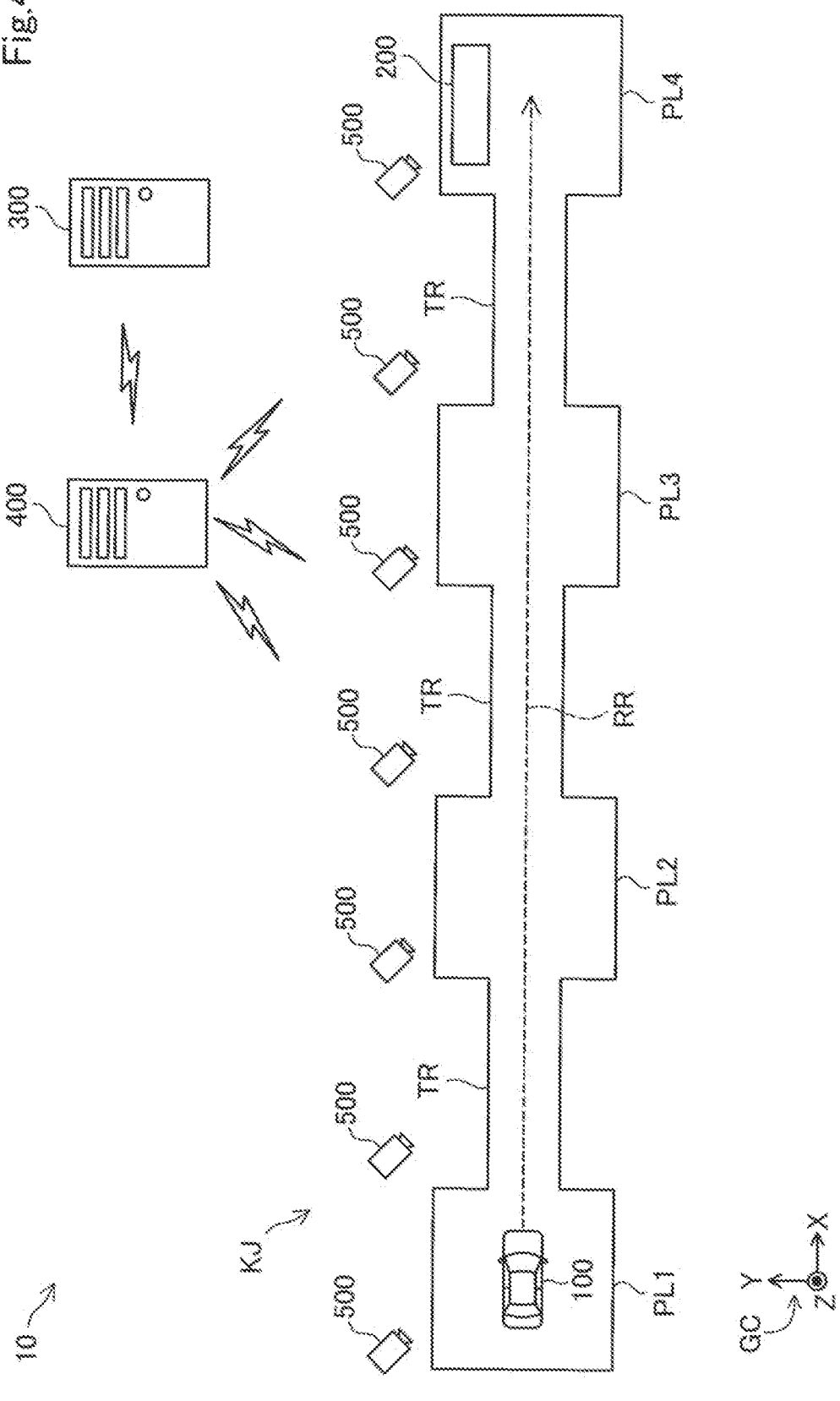
FIG. 4 is an explanatory view showing a situation where the vehicle runs by remote control in a factory.

FIG. 4 is an explanatory view showing a situation where the vehicle 100 runs by remote control in the factory KJ. In the present embodiment, the vehicle 100 is conveyed to the first place PL1. The vehicle 100 is in a state runnable by remote control at the time of arrival at the first place PL1. The state of the vehicle 100 runnable by remote control is a state where the vehicle 100 includes at least the battery 110, the driving device 120, the steering device 130, the braking device 140, the vehicle controller 150, and the communication device 160, and is capable of fulfilling three functions including "run," "turn," and "stop" by remote control. The vehicle 100 may be brought to the state runnable by remote control as a result of implementation of work at the first place PL1. All the places PL1 to PL4 are connected to each other through a track TR allowing the vehicle 100 to run therethrough. The server device 400 determines a target route along which the vehicle 100 is to run to a destination through the track TR. In the present embodiment, the target route corresponds to a reference route RR. Two or more external sensors 500 are installed around the track TR. In the present embodiment, the external sensor 500 is a camera. The server device 400 is capable of acquiring the location and position of the vehicle 100 relative to the target route in real time by analyzing images captured by the camera as the external sensor 500. The server device 400 generates a control command for causing the vehicle 100 to run along the target route, and transmits the control command to the vehicle 100. The control command includes a running control signal described later. The vehicle controller 150 mounted on the vehicle 100 controls the driving device 120, the steering device 130, and the braking device 140 in response to the received control command, thereby causing the vehicle 100 to run. This allows the vehicle 100 to move from the first place PL1 to the fourth place PL4 by remote control without using a conveyance device such as a crane or a conveyor. In the present embodiment, the server device 400 is capable of remotely controlling the plurality of vehicles 100A to 100D simultaneously in parallel with each other. The server device 400 may remotely control the plurality of vehicles 100A to 100D one by one.

Figure 5:
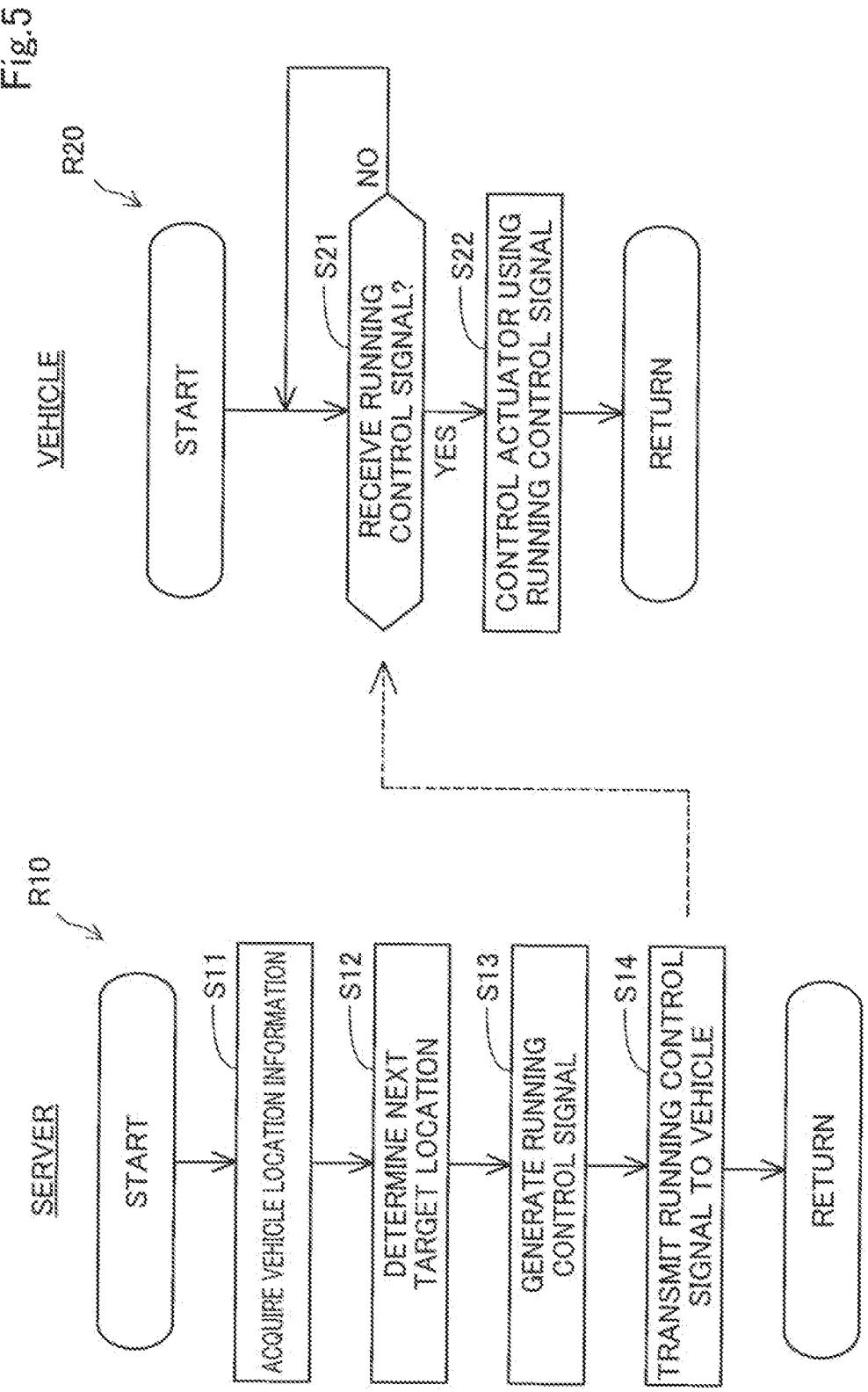
FIG. 5 is a flowchart showing a processing procedure of running control over the vehicle according to the first embodiment.

FIG. 5 is a flowchart showing a processing procedure of running control over the vehicle 100 according to the first embodiment. The processor 401 of the server device 400 performs a first routine R10 repeatedly in a predetermined cycle. The processor 151 of the vehicle controller 150 performs a second routine R20 repeatedly in a predetermined cycle.

The first routine R10 includes step S11, step S12, step S13, and step S14. In step S11, the server device 400 acquires vehicle location information using detection result output from the external sensor 500. The external sensor 500 is located outside the vehicle 100. The vehicle location information is locational information as a basis for generating a running control signal. In the present embodiment, the vehicle location information includes the location and orientation of the vehicle 100 in a reference coordinate system of the factory KJ. In the present embodiment, the reference coordinate system of the factory KJ is a global coordinate system GC and a location in the factory KJ can be expressed by X, Y, and Z coordinates in the global coordinate system GC. In the present embodiment, the external sensor 500 is a camera that is disposed in the factory KJ and outputs a captured image as detection result. In step S11, the server device 400 acquires the vehicle location information using the captured image acquired from the camera as the external sensor 500.

More specifically, in step S11, the server device 400 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system GC, thereby acquiring the location of the vehicle 100. The outer shape of the vehicle 100 in the captured image may be detected by inputting the captured image to a detection model DM using artificial intelligence, for example. The detection model DM is prepared in the system 10 or outside the system 10. The detection model DM is stored in advance in a memory of the server device 400, for example. An example of the detection model DM is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model DM and the label. The server device 400 can acquire the orientation of the vehicle 100 through estimation based on the direction of a motion vector of the vehicle 100 detected from change in location of a feature point of the vehicle 100 between frames of the captured images using optical flow process, for example.

In step S12, the server device 400 determines a target location to which the vehicle 100 is to move next. In the present embodiment, the target location is expressed by X, Y, and Z coordinates in the global coordinate system GC. The memory 402 of the server device 400 contains the reference route RR stored in advance as a route along which the vehicle 100 is to run. The route is expressed by a node indicating a departure place, a node indicating a way point, a node indicating a destination, and a link connecting nodes to each other. The server device 400 determines the target location to which the vehicle 100 is to move next using the vehicle location information and the reference route. The server device 400 determines the target location on the reference route ahead of a current location of the vehicle 100.

In step S13, the server device 400 generates a running control signal for causing the vehicle 100 to run toward the determined target location. In the present embodiment, the running control signal includes an acceleration and a steering angle of the vehicle 100 as parameters. The server device 400 calculates a running speed of the vehicle 100 from transition of the location of the vehicle 100 and makes comparison between the calculated running speed and a target speed of the vehicle 100 determined in advance. If the running speed is lower than the target speed, the server device 400 generally determines an acceleration in such a manner as to accelerate the vehicle 100. If the running speed is higher than the target speed as, the server device 400 generally determines an acceleration in such a manner as to decelerate the vehicle 100. If the vehicle 100 is on the reference route, server device 400 determines a steering angle and an acceleration in such a manner as to prevent the vehicle 100 from deviating from the reference route. If the vehicle 100 is not on the reference route, in other words, if the vehicle 100 deviates from the reference route, the server device 400 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S14, the server device 400 transmits the generated running control signal to the vehicle 100. Then, the server device 400 finishes the first routine R10. After lapse of a predetermined period of time, the server device 400 starts the first routine R10 again.

The second routine R20 includes step S21 and step S22. In step S21, the vehicle controller 150 mounted on the vehicle 100 waits until receipt of a running control signal from the server device 400. If the vehicle controller 150 receives the running control signal, the flow proceeds to step S22 where the vehicle controller 150 controls the driving device 120, the steering device 130, and the braking device 140 using the received running control signal, thereby causing the vehicle 100 to run at an acceleration and a rudder angle indicated by the running control signal. Then, the vehicle controller 150 finishes the second routine R20. After lapse of a predetermined period of time, the vehicle controller 150 starts the second routine R20 again.

The server device 400 allows a work assistance operation that is an operation for assisting in work on the vehicle 100 to be conducted by at least one of the vehicle 100 to be subjected to the work and a different vehicle 100 existing around the vehicle 100 to be subjected to the work. For example, one or more of various methods described next are usable as control methods of performing the work assistance operation.

<Work Assistance Method A1>

Figure 6:
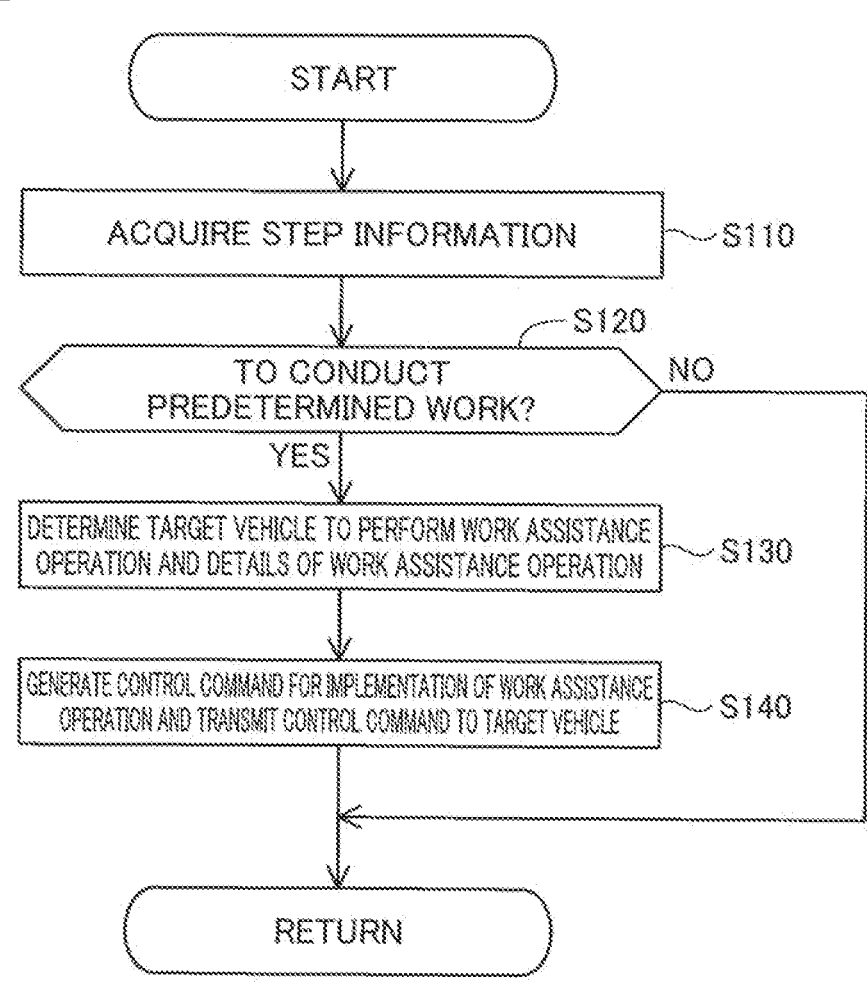
FIG. 6 is a flowchart showing details of a work assistance process.

FIG. 6 is a flowchart showing details of a work assistance process. The work assistance process is performed repeatedly in a predetermined cycle by the processor 401 of the server device 400. In step S110, the step information acquiring unit 420 acquires step information from the step management device 300.

In step S120, the determining unit 430 judges using the step information whether predetermined work on the vehicle 100 is to be conducted. The predetermined work is work to be assisted. In the following description, the predetermined work will be called target work. If it is not judged in step S120 that the target work is to be conducted, the processor 401 skips steps after step S120 to finish the work assistance process. After lapse of a predetermined period of time, the processor 401 starts the work assistance process again.

If it is judged in step S120 that the target work is to be conducted, the determining unit 430 determines the vehicle 100 to perform a work assistance operation for assisting in the target work and details of the work assistance operation in step S130. In the present embodiment, the memory 402 of the server device 400 includes a database DB stored in advance containing details of work and details of a work assistance operation in association with each other. The determining unit 430 determines a work assistance operation associated with the target work using the database DB. For example, the determining unit 430 specifies the vehicle 100 to be subjected to the target work using the step information. The step information indicates a progress in a step of manufacturing each vehicle 100, etc. This allows the determining unit 430 to see a place where each vehicle 100 is located and a situation where each vehicle 100 is placed using the step information. The determining unit 430 may grasp the location of each vehicle 100 using location information used for running control over each vehicle 100. The determining unit 430 may determine the vehicle 100 to be subjected to the target work to be a target vehicle, or may determine a different vehicle 100 to be the target vehicle that exists around the vehicle 100 to be subjected to the target work. The determining unit 430 may determine both the vehicle 100 to be subjected to the target work and the different vehicle 100 existing around the vehicle 100 to be subjected to the target work to be the target vehicles.

In step S140, the instructing unit 440 generates a control command for causing the target vehicle to perform the work assistance operation determined by the determining unit 430, and transmits the generated control command to the target vehicle. In the following description, the control command for causing the target vehicle to perform the work assistance operation will be called an assistance command. If the assistance command is received, the vehicle controller 150 mounted on the target vehicle 100 controls each part of the own vehicle in response to the assistance command, thereby causing the own vehicle to perform the work assistance operation. Then, the processor 401 finishes the work assistance process and starts the work assistance process again after lapse of a predetermined period of time.

Figure 7:
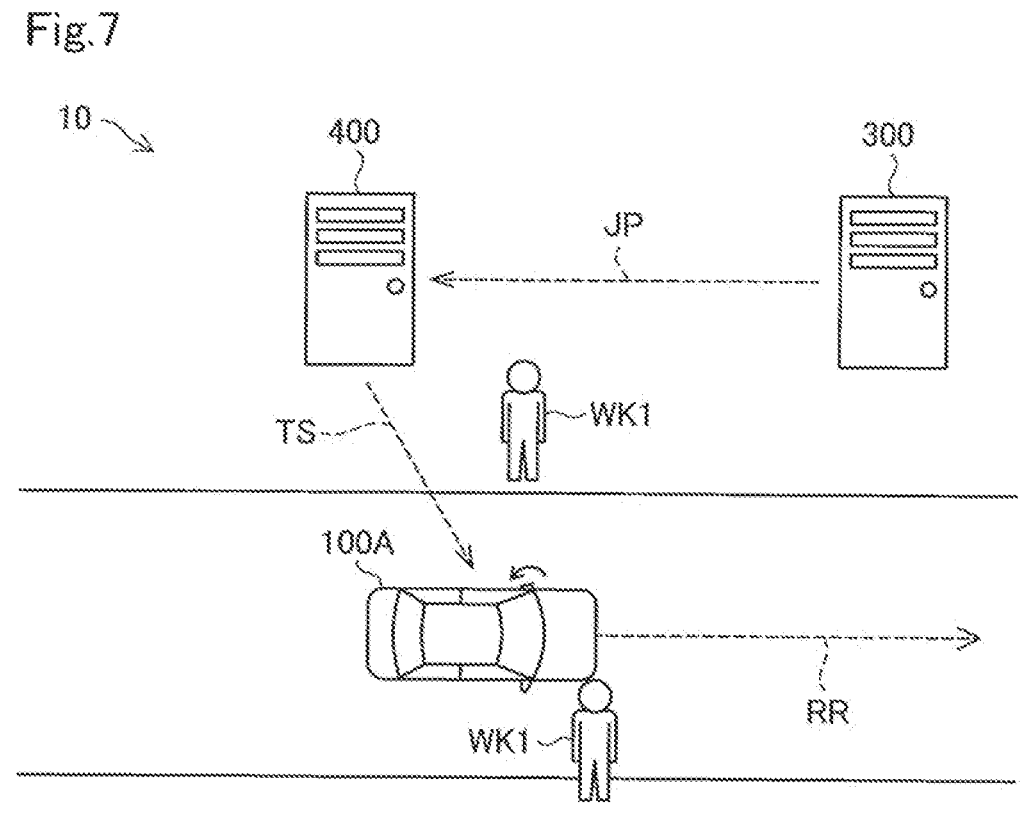

FIG. 7 is a first explanatory view showing a situation where the work assistance operation is performed. In FIG. 7, the target work is appearance inspection on the vehicle 100A. More specifically, the target work is coating surface inspection on the power-folding mirror 175. FIG. 7 shows a situation where two workers WK1 inspect the coating surface by visual examination. In FIG. 7, the work assistance operation is an operation of changing the orientation of a part of the target vehicle. More specifically, the work assistance operation is an operation of changing the orientation of the power-folding mirror 175 of the vehicle 100A during inspection on the own vehicle. For example, after an assistance command TS for implementation of the work assistance operation is transmitted from the server device 400 to the vehicle 100A, the vehicle 100A opens and closes the power-folding mirror 175 of the own vehicle a predetermined number of times. By changing the orientation of the power-folding mirror 175, it becomes possible to check the coating surface of the power-folding mirror 175 visually from various directions without requiring the worker WK1 to change a view angle. Thus, it is possible to improve workability of the inspection by the worker WK1. The coating surface of the power-folding mirror 175 may be inspected by image inspection using a camera instead of visual examination by the worker WK1. In this case, changing the orientation of the power-folding mirror 175 also makes it possible to check the coating surface of the power-folding mirror 175 from various directions using the camera. The orientation of the power-folding mirror 175 can be expressed by the angle of the power-folding mirror 175 with respect to the reference axis of the vehicle 100A.

Figure 8:
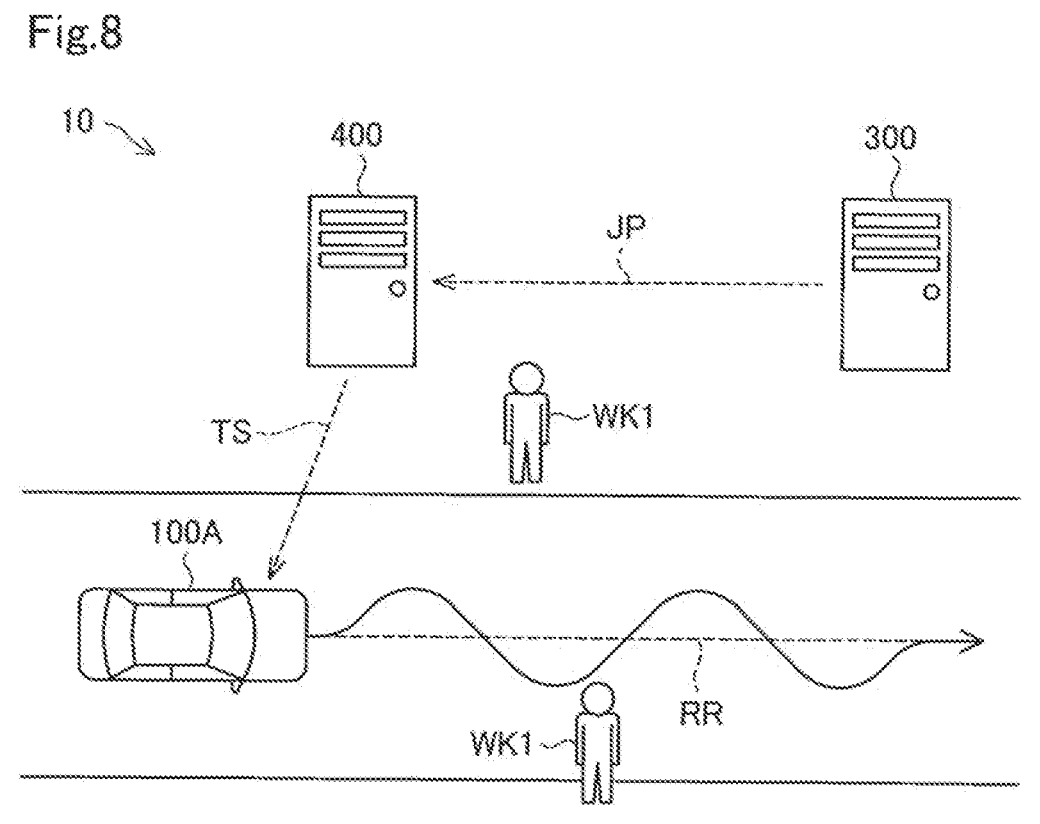

FIG. 8 is a second explanatory view showing a situation where the work assistance operation is performed. In FIG. 8, the target work is appearance inspection on the vehicle 100. More specifically, the target work is coating surface inspection on a vehicle body. FIG. 8 shows a situation where two workers WK1 inspect the coating surface by visual examination. In FIG. 8, the work assistance operation is an operation of changing the orientation of the target vehicle entirely. More specifically, the work assistance operation is an operation of changing the orientation of the vehicle 100A entirely during inspection on the own vehicle. For example, after an assistance command TS for implementation of the work assistance operation is transmitted from the server device 400 to the vehicle 100A, the vehicle 100A causes the own vehicle to run in a serpentine manner. By changing the orientation of the vehicle 100A, it becomes possible to check the coating surface of the vehicle body visually from various directions without requiring the worker WK1 to change a view angle. Thus, it is possible to improve workability of the inspection by the worker WK1. The coating surface of the vehicle body may be inspected by image inspection using a camera instead of visual examination by the worker WK1. In this case, changing the orientation of the vehicle 100A also makes it possible to check the coating surface of the vehicle body from various directions using the camera.

Figure 9:
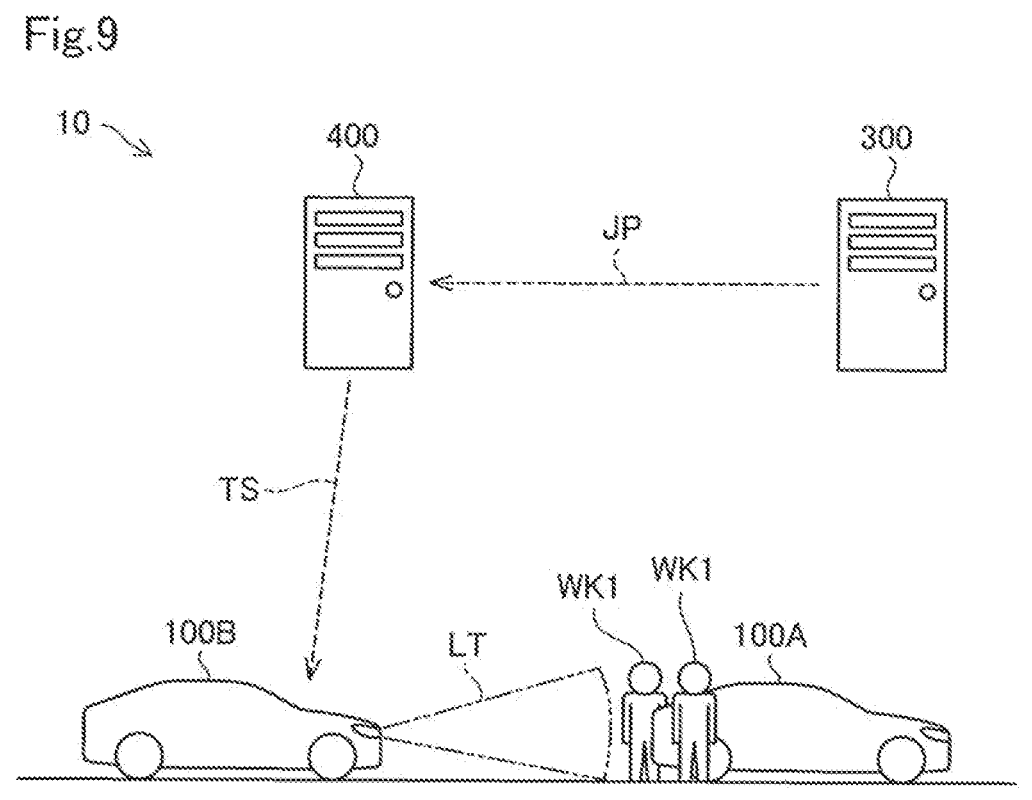

FIG. 9 is a third explanatory view showing a situation where the work assistance operation is performed. In FIG. 9, the target work is predetermined work on a rear part of the vehicle 100A. Details of the work are not particularly limited but may be mounting of a component or appearance inspection, for example. FIG. 9 shows a situation where two workers WK1 conduct the work on the rear part of the vehicle 100A. In FIG. 9, the work assistance operation is an operation of emitting light LT from a device mounted on the target vehicle. More specifically, the work assistance operation is an operation performed by the vehicle 100B located behind the vehicle 100A and is an operation of emitting the light LT from a headlight of the own vehicle to the rear part of the vehicle 100A during implementation of the work on the rear part of the vehicle 100A. After an assistance command TS for implementation of the work assistance operation is transmitted from the server device 400 to the vehicle 100B, the vehicle 100B emits the light LT from the headlight of the own vehicle to the rear part of the vehicle 100A. By doing so, even if the work is to be conducted at a dark place, the worker WK1 is still allowed to visually recognize the rear part of the vehicle 100A, etc. easily. Thus, it is possible to improve workability of the mounting, etc. by the worker WK1.

The work assistance operation is not limited to the above-described operations but it is enough for the work assistance operation to be an operation for assisting in work. The work assistance operation may be an operation of providing a worker with information by outputting sound or light from a device mounted on the target vehicle. The work assistance operation may be operations (a) to (f) as follows, for example.

(a) The work assistance operation may be an operation of outputting a voice message about a work procedure from the audio device 173 mounted on the target vehicle when a worker is at a loss about the work procedure. In this case, it is possible to instruct the worker of the work procedure.

(b) The work assistance operation may be an operation of displaying images about a work procedure on a display of a navigation device mounted on the target vehicle when a worker is at a loss about the work procedure. In this case, it is possible to instruct the worker of the work procedure.

(c) The work assistance operation may be an operation of illuminating a floor surface at a location where a worker is to stand using a headlight mounted on the target vehicle when the worker is at a loss about a location where the worker is to stand. In this case, it is possible to instruct the worker of the location where the worker is to stand.

(d) The work assistance operation may be an operation of instructing the number of a shelf of a rack from which a component or a tool is to be taken by causing a direction indicator mounting on the target vehicle to flash a predetermined number of times if a worker is at a loss about a shelf from which the worker is to take the component or the tool. In this case, it is possible to instruct the worker of the number of the shelf of the rack from which the worker is to take the component or the tool.

(e) The work assistance operation may be an operation of changing the color of light from the interior illumination device 176 mounted on the target vehicle if delay in work occurs in a previous step. For example, the color of light from the interior illumination device 176 may be changed as follows: to green in the absence of delay, to yellow on the occurrence of a small degree of delay, and to red on the occurrence of a large degree of delay. In this case, it is possible for a worker to determine a progress in the previous step from the color of the light.

(f) The work assistance operation may be an operation of indicating a progress in an own step by setting a pattern of light emission from the interior illumination device 176 mounted on the target vehicle. For example, the interior illumination device 176 may be configured into a rod shape, and the length of a part of the interior illumination device 176 from which light is to be emitted may be changed in response to the progress. The length of a part of the interior illumination device 176 from which light is to be emitted may be changed in response to remaining time. In this case, it is possible for a worker to see the progress in or remaining time of the own step from the length of the light-emitting part.

The work assistance operation may be an operation of imposing limitation on an operation of the target vehicle. The work assistance operation may be operations (g) and (h) as follows, for example.

(g) In the vicinity of a place where unusual sound inspection is to be conducted, limitation may be imposed so as to prevent sounding of the horn 172 mounted on the target vehicle. In this case, the horn 172 does not sound even if a worker makes an action of sounding the horn 172 erroneously, making it possible to reduce a likelihood that the horn 172 make unusual sound hard to hear in the unusual sound inspection.

(h) If work is to be conducted near a hood of the target vehicle, limitation may be imposed so as not to actuate a wiper of the target vehicle. in this case, the wiper is not actuated even if a worker makes an action of actuating the wiper erroneously, making it possible to reduce a likelihood that the work will be hindered by the actuation of the wiper.

<Work Assistance Method A2>

Figure 10:
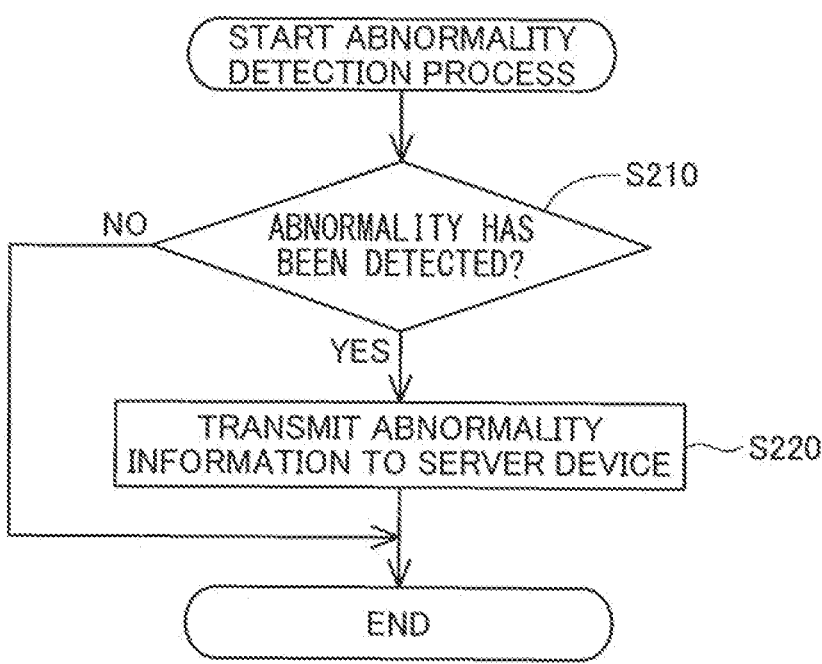
FIG. 10 is a flowchart showing details of an abnormality detection process.
Figure 11:
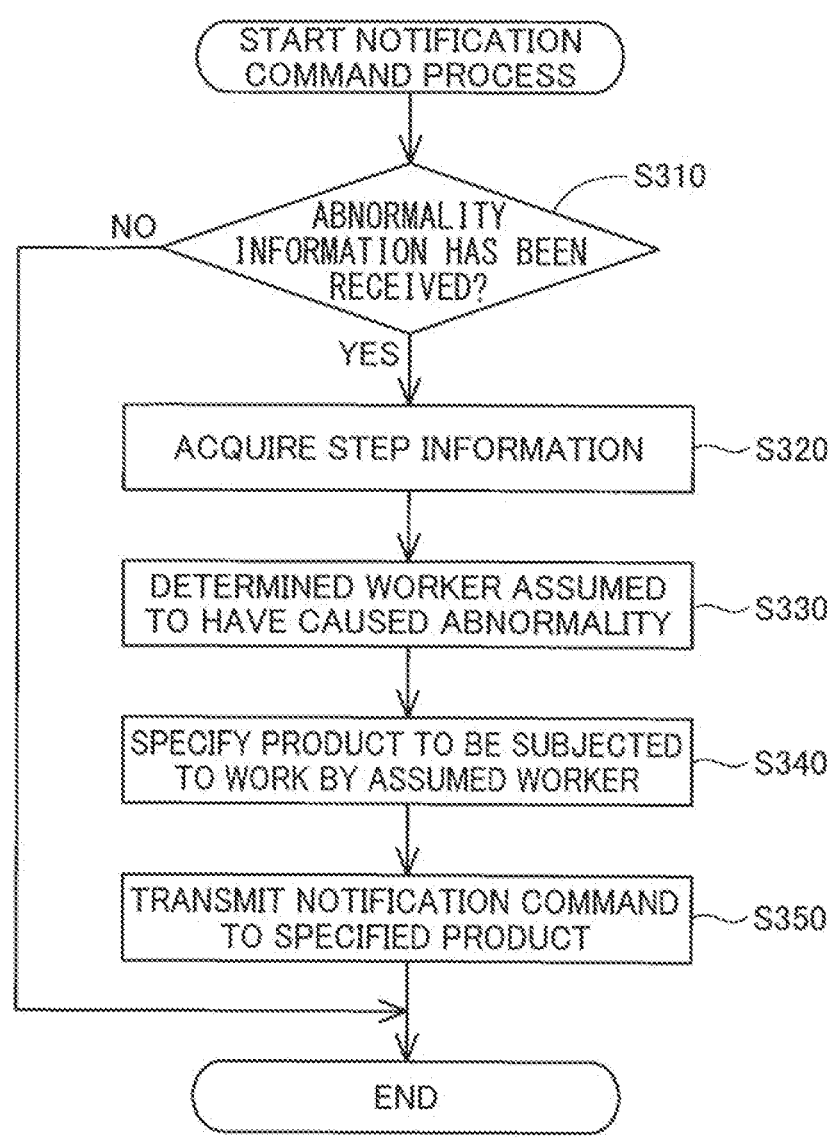
FIG. 11 is a flowchart showing details of a notification command process.
Figure 12:
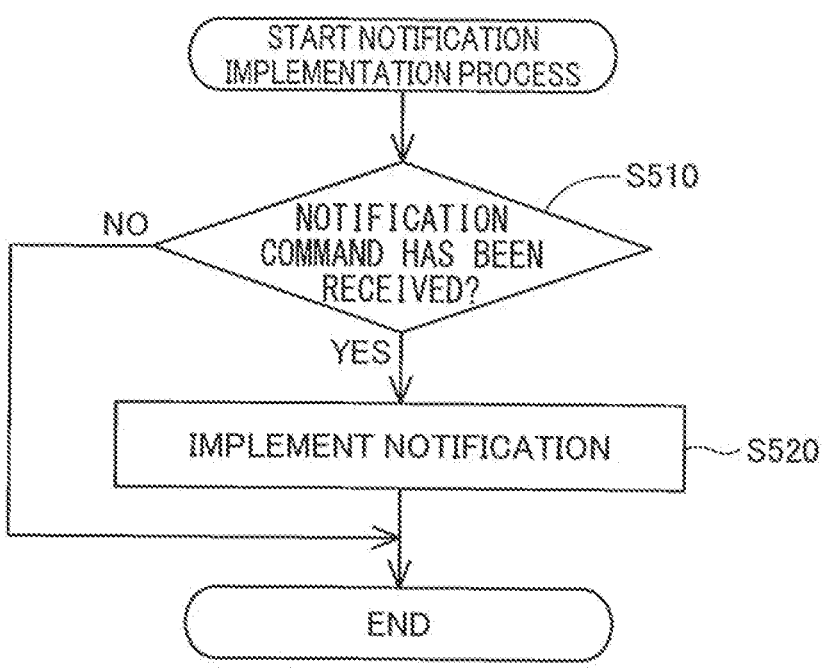
FIG. 12 is a flowchart showing details of a notification implementation process.

FIG. 10 is a flowchart showing details of an abnormality detection process. FIG. 11 is a flowchart showing details of a notification command process. FIG. 12 is a flowchart showing details of a notification implementation process. As shown in FIGS. 10 to 12, the work assistance operation may be an operation of notifying a worker of the occurrence of abnormality resulting from work conducted by this worker. The work assistance method A2 may also be called an abnormality notification method.

The abnormality detection process shown in FIG. 10 is performed repeatedly by the inspection device 200. When the abnormality detection process is started, the inspection device 200 inspects a product and judges whether abnormality has been detected at the product in step S210. If it is not judged in step S210 that abnormality has been detected at the product, the inspection device 200 skips steps after step S210 to finish the abnormality detection process. If it judged in step S210 that abnormality has been detected at the product, the inspection device 200 generates abnormality information and transmits the abnormality information to the server device 400 in step S220. Then, the inspection device 200 finishes the abnormality detection process.

The notification command process shown in FIG. 11 is performed repeatedly by the server device 400. When the notification command process is started, the abnormality information acquiring unit 410 judges in step S310 whether abnormality information has been received. If it is not judged in step S310 that the abnormality information has been received, the abnormality information acquiring unit 410 skips steps after step S310 to finish the notification command process. If it is judged in step S310 that the abnormality information has been received, the step information acquiring unit 420 receives the latest step information from the step management device 300 in step S320.

In step S330, the determining unit 430 determines a target worker who is a worker assumed to have caused abnormality at a product using the abnormality information and the step information. In the present embodiment, the abnormality information includes information indicating an identification number of the product where the abnormality has been detected and a type of the abnormality, and the step information includes information indicating work having been conducted, when and where the work was conducted, a worker having conducted the work, and a product having been subjected to the work. This allows the determining unit 430 to assume a place of the occurrence of the abnormality and a worker having caused the abnormality using the abnormality information and the step information. If a type of the abnormality is poor mounting of a bumper, for example, the determining unit 430 assumes that a place where work of mounting the bumper was conducted is the place of the occurrence of the abnormality, and assumes that a worker who conducted the work of mounting the bumper on the vehicle 100 where the abnormality has been detected is the worker having caused the abnormality.

In step S340, using step information, the determining unit 430 specifies a target product that is a product to be subjected to the work by the target worker. In the present embodiment, the step information includes information indicating work to be conducted, when and where the work is to be conducted, a worker to conduct the work, and a product to be subjected to the work, and information indicating a progress in the work. This allows the determining unit 430 to specify the target product using the step information.

In step S350, the instructing unit 440 generates a control command for causing the target product to notify the occurrence of the abnormality to the target worker at a time when the work is to be conducted on the target product by the target worker, and transmits the generated control command to the target product. In the following description, the control command for causing the target product to notify the occurrence of the abnormality to the target worker will be called a notification command. The notification command is included in the above-described assistance command. The "time when the work is to be conducted on the target product by the target worker" includes at least one of a time before the target worker starts the work on the target product, a time when the target worker starts the work on the target product, and a time immediately after the target worker starts the work on the target product. It is preferable that the target worker be notified of the occurrence of the abnormality before the target worker starts the work on the target product. Thus, the instructing unit 440 preferably transmits the notification command while the target product is going into a place where the target worker is assigned or immediately after finish of movement of the target product to the place where the target worker is assigned, for example. In the present embodiment, the instructing unit 440 finishes transmission of the notification command to the target product if a predetermined finish condition is satisfied. In the present embodiment, the finish condition is a condition to be satisfied if one of a condition A and a condition B given below is satisfied. The instructing unit 440 may transmit the notification command to the target product repeatedly until both the condition A and the condition B are satisfied.

Condition A: To be satisfied if the notification command has been transmitted to target products of a number set in advance.

Condition B: To be satisfied if abnormality resulting from the target worker has not occurred again.

Regarding the condition A, the target products of the number set in advance may be one, or two or more. The number set in advance is preferably a number allowing the target worker to fully recognize that the abnormality has occurred. If the target products of the number set in advance are three, for example, the instructing unit 440 transmits the notification command when the target worker is to conduct the work on a first target product, when the target worker is to conduct the work on a second target product, and when the target worker is to conduct the work on a third target product. After the instructing unit 440 transmits the notification command three times in total, the instructing unit 440 finishes transmission of the notification command.

Regarding the condition B, the absence of the recurrence of abnormality resulting from the target worker is restated that abnormality of the same type as the above-described abnormality is not detected from inspection on a product having been inspected after the product where the abnormality has been detected. The instructing unit 440 acquires inspection result from the inspection device 200 about the product having been inspected after the product where the abnormality has been detected, for example, and judges using the inspection result whether abnormality resulting from the target worker has not occurred again. The instructing unit 440 judges whether abnormality resulting from the target worker has not occurred again through inspection on products of a number set in advance. The number set in advance may be one, or two or more, for example. Preferably, the number set in advance is a number allowing the absence of the recurrence of abnormality to be determined fully.

The notification command transmitted by the instructing unit 440 is a control command for sounding the horn 172 provided at the target product or a control command for making the audio device 173 provided at the target product play a voice message. If the horn 172 is to be sounded, a sounding pattern of the horn 172 is preferably set in advance in order for the target worker to easily see that the sounding is notification indicating the occurrence of abnormality. If the audio device 173 is to play the voice message, the voice message preferably contains indication of the occurrence of abnormality and indication of a measure to prevent the recurrence of the abnormality. If a door is mounted on the target product, it is preferable that the voice message be played by the audio device 173 after the power window 174 of the door is opened in order to allow the target worker to easily hear the voice message played by the audio device 173. After the server device 400 finishes transmission of the notification command to the target product, the server device 400 finishes the notification command process.

The notification implementation process shown in FIG. 12 is performed repeatedly by the vehicle controller 150. When the notification implementation process is started, the vehicle controller 150 judges in step S510 whether a notification command has been received. If it is not judged in step S510 that the notification command has been received, the vehicle controller 150 skips steps after step S510 to finish the notification implementation process. If it is judged in step S510 that the notification command has been received, the vehicle controller 150 controls the horn 172 or the audio device 173 in response to the notification command, thereby notifying the target worker of the occurrence of abnormality in step S520. Then, the vehicle controller 150 finishes the notification implementation process.

Figure 13:
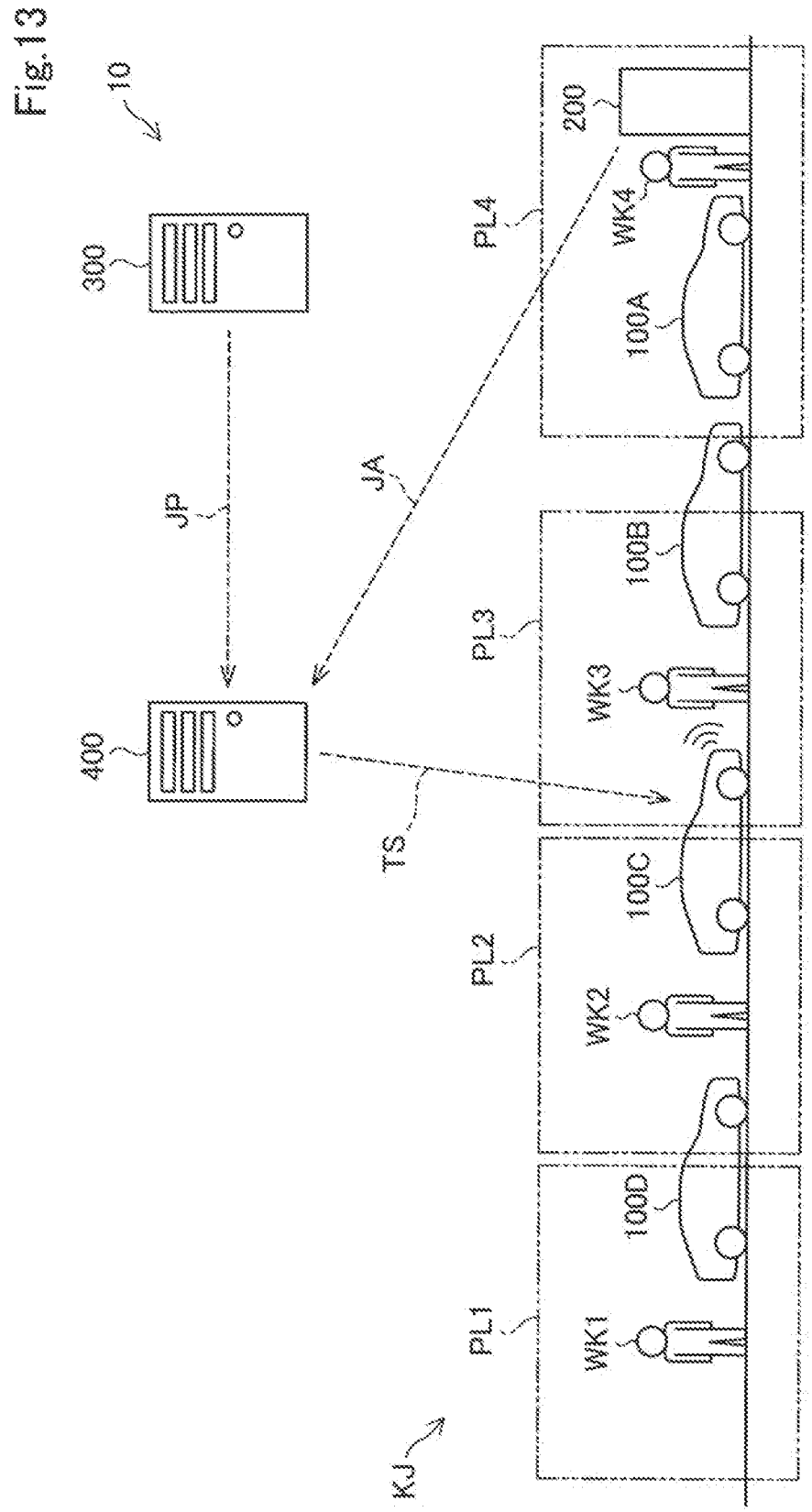
FIG. 13 is an explanatory view showing a situation where abnormality is notified from the vehicle to a worker.

FIG. 13 is an explanatory view showing a situation where abnormality is notified from the vehicle 100 to a worker. If the third workers WK3 conducts work of mounting a component on the vehicle 100A at the third place PL3 and poor mounting of the component is detected as a result of inspection on the vehicle 100A, for example, the inspection device 200 transmits abnormality information JA to the server device 400 indicating that the poor mounting of the component has been detected at the vehicle 100A. Step information JP transmitted from the step management device 300 indicates that a person having conducted the work of mounting the component on the vehicle 100A is the third worker WK3. Thus, the determining unit 430 assumes that a person having caused the poor mounting of the component on the vehicle 100A is the third worker WK3. The step information JP indicates that a product to be subjected to the work of mounting the component by the third worker WK3 includes the vehicle 1000 and the vehicle 100D. Thus, the determining unit 430 specifies products including the vehicle 1000 and the vehicle 100D as products each to be subjected to the work of mounting the component by the third worker WK3. If it is determined that the occurrence of abnormality is to be notified from two products, the instructing unit 440 transmits a notification command TS to the vehicle 100C to notify the occurrence of the abnormality to the third worker WK3 from the vehicle 1000 during implementation of the work on the vehicle 1000 by the third worker WK3, and then transmits the notification command TS to the vehicle 100D to notify the occurrence of the abnormality to the third worker WK3 from the vehicle 100D during implementation of the work on the vehicle 100D by the third worker WK3. By doing so, it becomes possible to notify the occurrence of the abnormality to the third worker WK3 having caused the abnormality at the vehicle 100A. If the third worker WK3 is scheduled to exchange a place of assignment with the second worker WK2 who conducts work at the second place PL2 after the third worker WK3 conducts the work of mounting the component on the vehicle 100A at the third place PL3 and the third worker WK3 exchanges the place of assignment as scheduled, the occurrence of the abnormality is notified from the vehicle 100D to the third worker WK3 during implementation of the work on the vehicle 100D by the third worker WK3 at the second place PL2, and then the occurrence of the abnormality is notified from a vehicle 100 next to the vehicle 100D to the third worker WK3 during implementation of the work on the next vehicle 100 by the third worker WK3 at the second place PL2.

According to the system 10 of the present embodiment described above, it is possible for the vehicle 100 to be subjected to the work by a worker or a different vehicle 100 existing around the vehicle 100 to assist in the work. This encourages optimization of a work environment of the work to allow improvement of workability of the worker.

According to the present embodiment, it is possible to notify the target worker of the occurrence of abnormality through the vehicle 100 to be subjected to work by the target worker. If the occurrence of abnormality is to be notified to a worker using an item carried by the worker, the carried item may hinder work or loss of the carried item may disable notification of the occurrence of the abnormality to the worker. By contrast, according to the present embodiment, it is possible to notify the target worker of the occurrence of the abnormality without using an item carried by the target worker.

According to the present embodiment, the occurrence of abnormality is notified using the horn 172 or the audio device 173 provided at the vehicle 100. This makes it possible to notify the occurrence of the abnormality without mounting a dedicated unit for notifying the occurrence of the abnormality on the vehicle 100. Furthermore, according to the present embodiment, if the audio device 173 is used for notification, the notification is made through a voice message. This makes it possible to notify particulars of abnormality or a measure to prevent the recurrence of the abnormality. Furthermore, according to the present embodiment, if the audio device 173 of the vehicle 100 equipped with a door is used for notification, the notification using the audio device 173 is made after the power window 174 provided at the door is opened. This allows a worker to easily recognize the notification using the audio device 173.

According to the present embodiment, notification indicating the occurrence of abnormality is finished if one of the condition A and the condition B is satisfied. The condition A is satisfied if a notification command has been transmitted to target products of the number set in advance. The condition B is satisfied if abnormality resulting from the target worker has not occurred again. Thus, it is possible to reduce a likelihood that the notification having become unnecessary will be made repeatedly.

B. Second Embodiment

Figure 14:
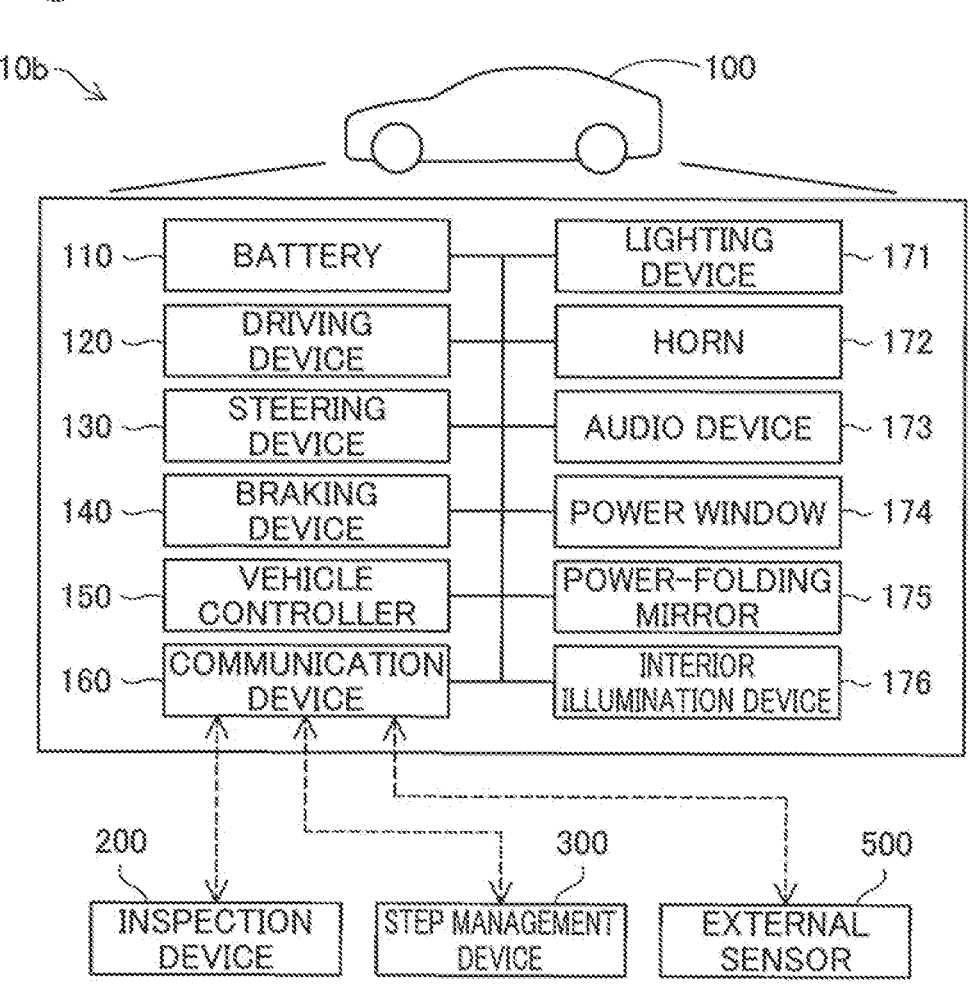
FIG. 14 is an explanatory view showing the configuration of a system according to a second embodiment.
Figure 15:
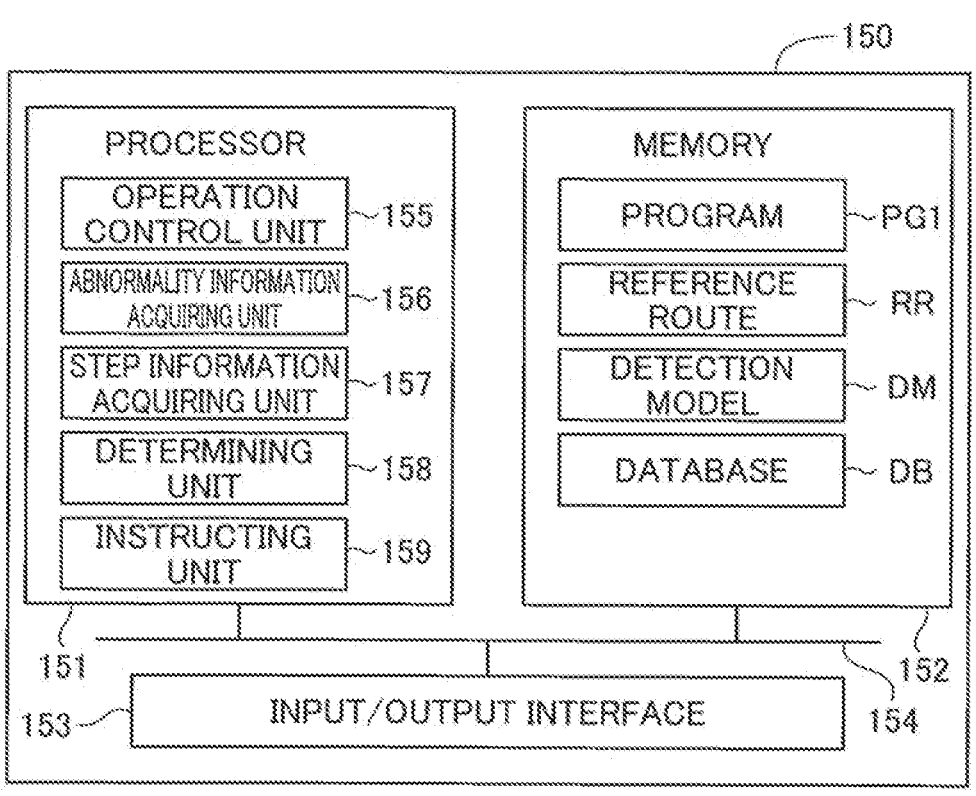
FIG. 15 is an explanatory view showing the configuration of a vehicle controller according to the second embodiment.

FIG. 14 is an explanatory view showing the configuration of a system 10*b* according to a second embodiment. FIG. 15 is an explanatory view showing the configuration of a vehicle controller 150 according to the second embodiment. The second embodiment differs from the first embodiment in that the system 10*b* does not include the server device 400, and that the vehicle 100 operates in response to self control instead of remote control by the server device 400. Unless specifically stated otherwise, the configuration of the second embodiment is the same as that of the first embodiment. In the present embodiment, the vehicle controller 150 corresponds to the "controller" of the present disclosure.

As shown in FIG. 14, in the present embodiment, the vehicle 100 is configured to be runnable by self control. The vehicle 100 is capable of communicating with the inspection device 200, the step management device 300, and the external sensor 500 via radio communication using the communication device 160. The vehicle 100 is further capable of communicating with a different vehicle differing from the own vehicle via radio communication using the communication device 160.

As shown in FIG. 15, the processor 151 of the vehicle controller 150 executes the computer program PG1 stored in advance in the memory 152 to function as the operation control unit 155, an abnormality information acquiring unit 156, a step information acquiring unit 157, a determining unit 158, and an instructing unit 159. The abnormality information acquiring unit 156, the step information acquiring unit 157, the determining unit 158, and the instructing unit 159 fulfill their functions basically the same as those of the abnormality information acquiring unit 410, the step information acquiring unit 420, the determining unit 430, and the instructing unit 440 of the first embodiment respectively. The abnormality information acquiring unit 156 acquires abnormality information from the inspection device 200. The step information acquiring unit 157 acquires step information from the step management device 300. The determining unit 158 determines a target vehicle to perform a work assistance operation and details of the work assistance operation. The instructing unit 159 instructs the own vehicle to perform the work assistance operation if the own vehicle is determined to perform the work assistance operation. The instructing unit 159 instructs a different vehicle to perform the work assistance operation if the different vehicle is determined to perform the work assistance operation. The memory 152 contains the database DB, the reference route RR, and a detection model DM stored in advance to be used for determining a target vehicle and details of a work assistance operation.

Figure 16:
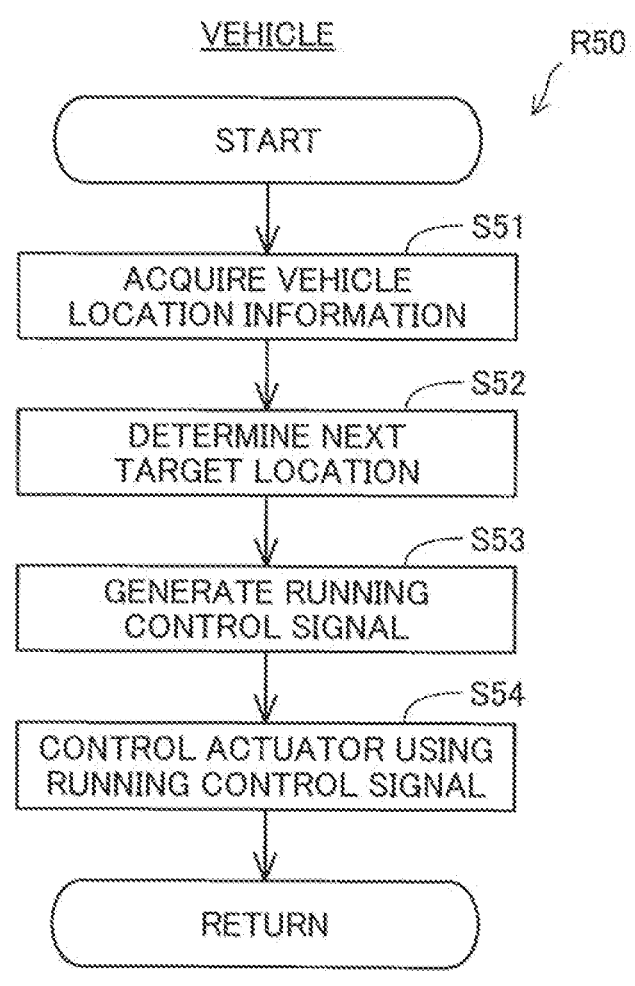
FIG. 16 is a flowchart showing a processing procedure of running control over a vehicle according to the second embodiment.

FIG. 16 is a flowchart showing a processing procedure of running control over the vehicle 100 according to the present embodiment. The processor 151 of the vehicle controller 150 performs a fifth routine R50 repeatedly in a predetermined cycle. The fifth routine R50 includes step S51, step S52, step S53, and step S54. In step S51, the operation control unit 155 acquires vehicle location information using detection result output from the camera as the external sensor 500. In step S52, the operation control unit 155 determines a target location to which the vehicle 100 is to move next. In step S53, the operation control unit 155 generates a running control signal for causing the vehicle 100 to run to the determined target location. In step S54, the operation control unit 155 controls the driving device 120, the steering device 130, and the braking device 140 using the generated running control signal, thereby causing the vehicle 100 to run by following a parameter indicated by the running control signal. The operation control unit 155 repeats the acquisition of vehicle location information, the determination of a target location, the generation of a running control signal, and the control over the driving device 120, the steering device 130, and the braking device 140 in a predetermined cycle.

According to the system 10*b* of the present embodiment described above, it is possible to cause the vehicle 100 to run by self control by the vehicle 100 without remote control over the vehicle 100 by the server device 400. According to the present embodiment, the vehicle controller 150 is capable of causing an own vehicle or a different vehicle to perform a work assistance operation by acquiring step information from the step management device 300. According to the present embodiment, the vehicle controller 150 is capable of causing the own vehicle or the different vehicle to perform a work assistance operation of notifying abnormality to a worker by acquiring abnormality information from the inspection device 200.

C. Other Embodiments (C1) In each of the systems 10 and 10*b* of the embodiments described above, the vehicle 100 is configured to be runnable by unmanned driving. Meanwhile, the vehicle 100 may not need to be configured to be runnable by unmanned driving. It is enough for the vehicle 100 to be configured to be capable of performing an operation other than running by unmanned driving. In this case, the vehicle 100 may be conveyed by a conveyance device such as a crane or a conveyor.

(C2) In the systems 10 of the first embodiment described above, abnormality information is transmitted from the inspection device 200 installed at the fourth place PL4 to the server device 400. Meanwhile, the fourth worker WK4 to conduct inspection at the fourth place PL4 may transmit the abnormality information to the server device 400 using a tablet terminal. In the systems 10*b* of the second embodiment described above, abnormality information is transmitted from the inspection device 200 installed at the fourth place PL4 to the vehicle controller 150. Meanwhile, the fourth worker WK4 to conduct inspection at the fourth place PL4 may transmit the abnormality information to the vehicle controller 150 using a tablet terminal.

(C3) In each of the systems 10 and 10*b* of the embodiments described above, the occurrence of abnormality is notified to a target worker by generating sound from the horn 172 or the audio device 173 of the vehicle 100. Meanwhile, each of the systems 10 and 10*b* may notify the occurrence of the abnormality to the target worker by turning on a headlight or a hazard light of the vehicle 100, namely, by generating light from a device provided at the vehicle 100. Each of the systems 10 and 10*b* may notify the occurrence of the abnormality to the target worker by generating sound and light from a device provided at the vehicle 100.

(C4) In each of the above-described embodiments, the external sensor 500 is not limited to the camera but may be the distance measuring device, for example. The distance measuring device is a light detection and ranging (LiDAR) device, for example. In this case, detection result output from the external sensor 500 may be three-dimensional point cloud data representing the vehicle 100. The server device 400 and the vehicle 100 may acquire the vehicle location information through template matching using the three-dimensional point cloud data as the detection result and reference point cloud data, for example.

(C5) In the above-described first embodiment, the server device 400 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server device 400 may acquire vehicle location information, determine a target location to which the vehicle 100 is to move next, and generate a route from a current location of the vehicle 100 indicated by the acquired vehicle location information to the target location. The server device 400 may generate a route to the target location between the current location and a destination or generate a route to the destination. The server device 400 may transmit the generated route to the vehicle 100. The vehicle 100 may generate a running control signal in such a manner as to cause the vehicle 100 to run along the route received from the server device 400 and control the driving device 120, the steering device 130, and the braking device 140 using the generated running control signal.

(2) The server device 400 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control the driving device 120, the steering device 130, and the braking device 140 using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server device 400 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C6) In the above-described second embodiment, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(C7) In the above-described second embodiment, the vehicle 100 acquires vehicle location information using detection result from the external sensor 500. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control the driving device 120, the steering device 130, and the braking device 140 using the generated running control signal. In this case, the vehicle 100 is capable of running without using any detection result from an external sensor 500. The vehicle 100 may acquire target arrival time or traffic congestion information from outside the vehicle 100 and reflect the target arrival time or traffic congestion information in at least one of the route and the running control signal. The functional configuration of the system 10 may be entirely provided at the vehicle 100. Specifically, the processes realized by the system 10 in the present disclosure may be realized by the vehicle 100 alone.

(C8) In the above-described first embodiment, the server device 400 automatically generates a running control signal to be transmitted to the vehicle 100. By contrast, the server device 400 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server device 400 through wire communication or wireless communication, for example, and the server device 400 may generate a running control signal responsive to the operation on the operating device.

(C9) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C10) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C11) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

(C12) The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A controller comprising:
a memory storing a program; and
at least one processor operatively connected to the memory, wherein the at least one processor is configured to execute the program to:
acquire step information, the step information being an information relating to a manufacturing step of manufacturing a moving object;
based on the step information, determine a work assistance operation to be performed by a target moving object, wherein the work assistance operation is an operation to assist work on the moving object in the manufacturing of the moving object, the target moving object including at least one of the moving object and another moving object being located around the moving object, the moving object configured to be operable by unmanned driving, the another moving object configured to be operable by unmanned driving; and
instruct the target moving object to perform the work assistance operation.

2. The controller according to claim 1, wherein
the work assistance operation includes an operation of changing the orientation of at least a part of the moving object.

3. The controller according to claim 2, wherein
the work is to inspect an appearance of the moving object,
the moving object includes a power-folding mirror, and
the work assistance operation includes an operation of changing the orientation of the power-folding mirror.

4. The controller according to claim 2, wherein
the work is to inspect an appearance of the moving object, and
the work assistance operation includes an operation of causing the moving object to run in a serpentine manner.

5. The controller according to claim 1, wherein
the target moving object is the another moving object,
the another moving object includes an illumination device configured to emit light, and
the work assistance operation includes an operation of emitting light to the moving object from the illumination device of the another moving object.

6. The controller according to claim 1, wherein
the target moving object includes at least one device of a sound device configured to output sound and an illumination device configured to emit light, and
the work assistance operation includes an operation of providing information to a worker who performs the work using the at least one device.

7. The controller according to claim 1, wherein
the target moving object includes an illumination device configured to emit light changeable in color, and
the work assistance operation includes an operation of changing the color of light emitted from the illumination device in response to a progress in the work.

8. The controller according to claim 1, wherein the target moving object includes an abnormality information acquiring unit configured to acquire abnormality information as information indicating abnormality at another moving object having been finished the work, and the work assistance operation includes an operation of notifying the occurrence of the abnormality from the target moving object to a worker who performs the work.

9. The controller according to claim 8, wherein the target moving object is a vehicle and includes a sound device arranged inside the vehicle, and the work assistance operation includes an operation of notifying the occurrence of the abnormality to the worker using the sound device.

10. The controller according to claim 9, wherein the target moving object further includes a power window, and the work assistance operation includes an operation of notifying the occurrence of the abnormality to the worker using the sound device after the power window is opened.

11. The controller according to claim 8, wherein the work assistance operation includes an operation of notifying the occurrence of the abnormality and a measure to prevent the recurrence of the abnormality to the worker.

12. A control method comprising:

acquiring step information, the step information being an information relating to a manufacturing step of manufacturing a moving object;

based on the step information, determining a work assistance operation to be performed by a target moving object, wherein the work assistance operation is an operation to assist work on the moving object in the manufacturing of the moving object, the target moving object including at least one of the moving object and another moving object being located around the moving object, the moving object configured to be operable by unmanned driving, the another moving object configured to be operable by unmanned driving; and instructing the target moving object to perform the work assistance operation.

\* \* \* \* \*